(12) United States Patent
Espinoza et al.

(10) Patent No.: US 7,176,160 B2
(45) Date of Patent: *Feb. 13, 2007

(54) METHOD FOR FORMING A FISCHER-TROPSCH CATALYST USING A BOEHMITE SUPPORT

(75) Inventors: Rafael L. Espinoza, Ponca City, OK (US); Kandaswamy Jothimurugesan, Ponca City, OK (US); Yaming Jin, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/688,412

(22) Filed: Oct. 16, 2003

(65) Prior Publication Data

US 2004/0127587 A1    Jul. 1, 2004

Related U.S. Application Data

(60) Provisional application No. 60/419,073, filed on Oct. 16, 2002.

(51) Int. Cl.
*B01J 23/40* (2006.01)
*B01J 23/42* (2006.01)
*B01J 23/00* (2006.01)
*B01J 23/56* (2006.01)
*B01J 23/70* (2006.01)

(52) U.S. Cl. .................. 502/327; 502/332; 502/335; 502/336; 502/355; 502/415; 502/439

(58) Field of Classification Search ........ 502/325–327, 502/332, 335–338, 355, 415, 439; 501/127, 501/153; 423/625–628
See application file for complete search history.

(56) References Cited

U.S. PATENT DOCUMENTS

| 2,838,375 A | * | 6/1958 | Gring et al. ............... 423/628 |
| 2,938,002 A | * | 5/1960 | Braithwaite et al. ....... 502/314 |
| 3,242,101 A | * | 3/1966 | Erickson et al. ........... 502/314 |

(Continued)

FOREIGN PATENT DOCUMENTS

WO    WO 99/61550    12/1999

(Continued)

OTHER PUBLICATIONS

PCT International Search Report for International Application PCT/US2004/033558 dated Jan. 17, 2005 (5 p.).

(Continued)

*Primary Examiner*—Cam N. Nguyen
(74) *Attorney, Agent, or Firm*—Conley Rose P.C.

(57) ABSTRACT

A method is provided for forming a highly active Fischer-Tropsch catalyst using boehmite having a particular crystallite size. In this method, a support material comprising boehmite is contacted with a catalytic metal-containing compound to form a catalyst precursor. The boehmite is selected to have an average crystallite size in the range of from about 6 nanometers (nm) to about 30 nm. An alternate embodiment uses a mixture of boehmites with various average crystallite sizes in the range of from about 4 nm to about 30 nm, differing by at least by 1 nm. Subsequently, the catalyst precursor is calcined to convert the boehmite to a stabilized aluminum oxide structure, thereby forming a catalyst support having a good attrition resistance and a relatively high hydrothermal stability.

48 Claims, 2 Drawing Sheets

U.S. PATENT DOCUMENTS

| | | | |
|---|---|---|---|
| 3,245,919 A | | 4/1966 | Gring et al. |
| 3,379,499 A | * | 4/1968 | Moehl .................. 423/628 |
| 3,654,186 A | * | 4/1972 | Vesely ................... 502/317 |
| 3,937,742 A | * | 2/1976 | Yoo ....................... 568/909 |
| 3,945,945 A | | 3/1976 | Kiovsky et al. |
| 4,117,105 A | * | 9/1978 | Hertzenberg et al. ..... 423/625 |
| 4,581,157 A | | 4/1986 | Twigg |
| 4,602,000 A | | 7/1986 | Dupin et al. |
| 4,797,139 A | * | 1/1989 | Bauer ........................ 51/293 |
| 5,780,381 A | * | 7/1998 | Wilson et al. ............. 502/308 |
| 5,858,325 A | * | 1/1999 | Hall et al. ................. 423/625 |
| 5,874,381 A | | 2/1999 | Bonne et al. |
| 6,171,573 B1 | * | 1/2001 | Sato ........................ 423/626 |
| 6,214,211 B1 | * | 4/2001 | Itoh ......................... 208/118 |
| 6,224,846 B1 | * | 5/2001 | Hurlburt et al. ........... 423/625 |
| 6,255,358 B1 | | 7/2001 | Singleton et al. .......... 518/715 |
| 6,402,989 B1 | | 6/2002 | Gaffney ..................... 252/373 |
| 6,409,940 B1 | | 6/2002 | Gaffney et al. ............. 252/373 |
| 6,540,843 B1 | * | 4/2003 | Liu et al. ................... 148/243 |
| 6,740,621 B2 | | 5/2004 | Singleton et al. .......... 502/429 |
| 6,806,226 B2 | | 10/2004 | Van Berge et al. |
| 6,831,037 B2 | * | 12/2004 | Szymanski et al. ......... 502/355 |
| 6,835,690 B2 | | 12/2004 | Van Berge et al. |
| 2001/0031793 A1 | | 10/2001 | Singleton et al. .......... 518/715 |
| 2002/0006374 A1 | | 1/2002 | Kourtakis et al. ........ 423/418.2 |
| 2002/0009407 A1 | | 1/2002 | Kourtakis et al. ........ 423/418.2 |
| 2003/0162849 A1 | | 8/2003 | Van Berge et al. |
| 2004/0127352 A1 | * | 7/2004 | Jin et al. ................... 502/332 |
| 2004/0127586 A1 | * | 7/2004 | Jin et al. ................... 518/715 |
| 2004/0132833 A1 | * | 7/2004 | Espinoza et al. ........... 518/718 |
| 2004/0132834 A1 | * | 7/2004 | Ortego et al. .............. 518/718 |
| 2004/0138317 A1 | | 7/2004 | Xie et al. |
| 2004/0186188 A1 | | 9/2004 | Van Berge et al. |
| 2005/0234137 A1 | * | 10/2005 | Espinoza et al. ........... 518/716 |

FOREIGN PATENT DOCUMENTS

| | | |
|---|---|---|
| WO | WO 00/45948 | 8/2000 |
| WO | WO 01/76735 A1 | 10/2001 |
| WO | WO 01/87480 A1 | 11/2001 |
| WO | WO 02/07883 A2 | 1/2002 |
| WO | WO 02/07883 A3 | 1/2002 |
| WO | WO 02/20395 A2 | 3/2002 |
| WO | WO 02/20395 A3 | 3/2002 |
| WO | WO 03/012008 A2 | 2/2003 |
| WO | WO 03/012008 A3 | 2/2003 |
| WO | WO 2004/035193 | 4/2004 |
| ZA | 2001/6213 | 7/2002 |

OTHER PUBLICATIONS

Becker, Robert E., et al, "Computer-Aided Design of Catalysts," New York, Marcel Dekker, Inc., 1993, p. 215.

Gan, Bee K., et al, "Structure Refinement of Gamma Alumina—Revisited," http://www.us.iucr.org/iucr-top/cong/17/iucr/abstracts/abstracts/E0930.html.

Klug, Harold P., et al, "X-Ray Diffraction Procedures: For Polycrystalline and Amorphous Materials," John Wiley & Sons, 2nd Edition, 1974. p. 656.

* cited by examiner

METHOD FOR FORMING A FISCHER-TROPSCH CATALYST USING A BOEHMITE SUPPORT

CROSS-REFERENCE TO RELATED APPLICATIONS

The present application claims benefit of priority from U.S. Provisional Application Ser. No. 60/419,073, filed Oct. 16, 2002, and entitled "Hydrothermally Stable Catalyst and Method of Making Same," which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to the formation of a Fischer-Tropsch catalyst. More specifically, the invention relates to a process for forming a Fischer-Tropsch catalyst using a boehmite support material having average crystallite size ranging in size from about 4 nm to 30 nm.

BACKGROUND OF THE INVENTION

Natural gas found in deposits in the earth is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is usually transported large distances from the wellhead to commercial destinations in pipelines. This transportation presents technological challenges due in part to the large volume occupied by the gas. Because the volume of a gas is so much greater than the volume of a liquid containing the same number of molecules, the process of transporting natural gas typically includes chilling and/or pressurizing the natural gas in order to liquefy it. Unfortunately, this liquefaction contributes to the final cost of the natural gas.

Further, naturally occurring sources of crude oil used for liquid fuels, such as gasoline and middle distillates, have been decreasing, and supplies are not expected to meet demand in the coming years. Middle distillates typically include heating oil, jet fuel, diesel fuel, and kerosene. Because those fuels are liquid under standard atmospheric conditions, they have the advantage that in addition to their value, they do not require the energy, equipment, and expense of the liquefaction process. Thus, they can be transported more easily in a pipeline than natural gas.

Therefore, for all of the above-described reasons, there has been an interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane (the major chemical component of natural gas) is reacted with oxygen to form synthesis gas (syngas), which is a combination of carbon monoxide gas and hydrogen gas. In the second transformation, known as the Fischer-Tropsch (FT) process, carbon monoxide is reacted with hydrogen to form organic molecules known as hydrocarbons, which contain carbon and hydrogen atoms. Other organic molecules known as oxygenates, which contain oxygen in addition to carbon and hydrogen, also may be formed during the FT process.

The Fischer-Tropsch product stream commonly contains a range of hydrocarbons, including gases, liquids, and waxes. It is desirable to primarily obtain hydrocarbons that are liquids and waxes, e.g., $C_5^+$ hydrocarbons, that may be processed to produce fuels. For example, the hydrocarbon liquids may be processed to yield gasoline, as well as heavier middle distillates. The hydrocarbon waxes may be subjected to additional processing steps for conversion to liquid hydrocarbons.

FT process is commonly facilitated by a catalyst having the function of increasing the rate of reaction without being consumed by the reaction. A feed containing syngas is contacted with the catalyst in a reaction zone that may include one or more reactors. Common catalysts for use in the FT process contain at least one catalytic metal from Groups 8, 9, or 10 of the Periodic Table (based on the new IUPAC notation, which is used throughout the present specification). Cobalt metal is a particularly desirable catalytic metal in catalysts that are used to convert natural gas to heavy hydrocarbons suitable for the production of diesel fuel. Alternatively, iron, nickel, and ruthenium have served as the catalytic metal. Nickel catalysts favor termination and are useful for aiding the selective production of methane from syngas. Iron has the advantage of being readily available and relatively inexpensive but the disadvantage of a high water-gas shift activity. Ruthenium has the advantage of high activity but is quite expensive.

The catalysts often further employ a promoter in conjunction with the principal catalytic metal. A promoter typically improves one or more measures of the performance of a catalyst, such as activity, stability, selectivity, reducibility, or regenerability. In addition to the catalytic metal, a FT catalyst often includes a support. The support is typically a porous material that provides mechanical support and a high surface area upon which the catalytic metal and any promoter are deposited.

The method of preparation of a catalyst may influence the performance of the catalyst in the FT reaction. In a common method of loading the catalytic metal to a support, the support is impregnated with a solution containing a dissolved metal-containing compound. When a promoter is used, an impregnation solution may further contain a promoter-containing compound. After drying the support, the resulting catalyst precursor is calcined, typically by heating in an oxidizing atmosphere, to decompose the metal-containing compound to a metal oxide. The preparation of the catalyst may include more than one impregnation, drying, and calcination cycles. When the catalytic metal is cobalt, the catalyst precursor is then typically reduced in hydrogen to convert the oxide compound to reduced "metallic" metal. When the catalyst includes a promoter, the reduction conditions may cause reduction of the promoter, or the promoter may remain as an oxide compound. As a result of the method described above, the catalyst precursor becomes an activated catalyst capable of facilitating the conversion of syngas to hydrocarbons having varying numbers of carbon atoms, and thus having a range of molecular weights.

Catalyst supports employed for the FT process have typically been refractory oxides (e.g., silica, alumina, titania, thoria, zirconia or mixtures thereof, such as silica-alumina). It has been asserted that the FT reaction is only weakly dependent on the chemical identity of the metal oxide support (see Iglesia, E. et al., Becker, E. R. et al. Ed. *Computer-Aided Design of Catalysts*., New York: Marcel Dekker, Inc., 1993.). Nevertheless, because it continues to be desirable to improve the activity of Fischer-Tropsch catalysts, other types of catalyst supports are being investigated.

In particular, various aluminum oxide compounds have been investigated. For example, gamma-alumina (γ-alumina) is an oxide compound of aluminum having, in its pure form, the empirical formula, $\gamma\text{-}Al_2O_3$. Gamma-alumina is distinguished from other polymorphic forms of alumina, such as alpha-alumina ($\alpha\text{-}Al_2O_3$), by its structure, which may be detected, for example, by x-ray diffraction. As disclosed by B. K. Gan, et al. at http://www.us.iucr.org/iucr-top/cong/17/iucr/abstracts/abstracts/E0930.html, the structure of gamma-alumina is conventionally thought to approximate a spinel, with either a cubic or tetragonal symmetry. Gan, et al. further disclose that both cubic and tretragonal polymorphs may coexist.

In a common method of producing a gamma-alumina support, naturally occurring bauxite is transformed to gamma-alumina via intermediates. Bauxite is an ore that may be obtained from the earth's crust. Minerals commonly found in bauxite and the empirical formulas of their pure forms include gibbsite ($\alpha\text{-}Al_2O_3\cdot3H_2O$), boehmite ($\alpha\text{-}Al_2O_3.H_2O$), diaspore ($\beta\text{-}Al_2O_3.H_2O$), hematite ($\alpha\text{-}Fe_2O_3$), goethite ($\alpha\text{-}FeOOH$), magnetite ($Fe_3O_4$), siderite ($FeCO_3$), ilmenite ($FeTiO_3$), anatase ($TiO_2$), rutile ($TiO_2$), brookite ($TiO_2$), hallyosite ($Al_2O_3.2SiO_2.3H_2O$), kaolinite ($Al_2O_3.2SO_2.2H_2O$), and quartz ($SiO_2$)

In a first transformation, gibbsite is derived from bauxite. The Bayer process is one common process for producing gibbsite from bauxite. The Bayer process was originally developed by Karl Joseph Bayer in 1888 and is the basis of most commercial processes for the production of gibbsite. As it is conventionally carried out, the Bayer process includes digestion of bauxite with sodium hydroxide in solution at elevated temperature and pressure to form sodium aluminate in solution, separation of insoluble impurities from the solution, and precipitation of gibbsite from the solution.

In a second transformation, boehmite is derived from gibbsite. As disclosed above, gibbsite is a trihydrated alumina having, in its pure form, the empirical formula $\alpha Al_2O_3.3H_2O$. Transformation of gibbsite to boehmite may be accomplished by varying the conditions so as to influence the thermodynamic equilibrium to favor boehmite. For example, a method for producing boehmite from gibbsite may include dehydratization in air at 180° C.

In a third transformation, gamma-alumina is derived from boehmite. Boehmite in its pure form is a monohydrated alumina having, in its pure form, the empirical formula $\alpha\text{-}Al_2O_3.H2O$. Alternately, boehmite is denoted in the art by γ-AlO(OH). Boehmite is also sometimes called aluminum monohydroxide. The respective α and γ prefixes refer to the crystalline form. Boehmite is distinguished from other polymorphic forms of monohydrated alumina, such as diaspore (β-Al2O3.H2O), by its structure or crystalline form. In particular, boehmite typically has orthorhombic symmetry. Transformation of boehmite to gamma-alumina may be accomplished by varying the conditions so as to influence the thermodynamic equilibrium to favor gamma-alumina.

A support material for catalysts is desirably stable under reactive conditions. Under ambient conditions of temperature and pressure, such as for storage, gamma-alumina is less reactive and therefore more stable than boehmite. Thus, gamma-alumina is typically regarded as a more desirable support material than boehmite. Further, calcination of boehmite to form gamma-alumina before loading catalytic metal to the gamma-alumina is generally regarded as a desirable step in the formation of a catalyst from boehmite. Therefore, catalytic metals are not typically loaded to boehmite itself in forming a catalyst, but to more stable alumina phases such as gamma-alumina or another transition alumina.

The boehmite can be transformed to a gamma-alumina support via calcination, before loading the support with a catalytic metal such as cobalt. The calcination may be achieved, for example, by heating the boehmite in air to a temperature greater than the thermodynamic transformation temperature, which is about 500° C. at ambient pressure. The boehmite is usually calcined at a relatively high temperature of approximately 750° C. However, the surface area and overall volume of the support decreases as the calcination temperature increases, causing the metal surface area of the ensuing catalyst to be lower than desired.

It has been discovered that the catalyst has a higher hydrothermal stability when the boehmite is calcined in the presence of a catalytic metal precursor. The boehmite is impregnated with the catalytic metal precursor before calcination. The calcination proceeds at a temperature sufficient to decompose the catalytic metal precursor, desirably to an oxide of the catalytic metal. Further, the calcination proceeds at a temperature less than the temperature at which loss of support surface area is appreciable. Thus, when the catalytic metal includes cobalt, the calcination preferably proceeds at a temperature of at least 200° C. and less than about 800° C.

Unfortunately, the catalytic metal precursor migrates into the boehmite during the calcination, undesirably causing the size of the boehmite pores to change. Hence, this calcination method does not achieve the desired pore size on the catalyst support. As a result, the performance of the ensuing stabilized supported catalyst during the FT process is compromised. That is, syngas conversion and $C_5^+$ hydrocarbon selectivity are not as high as desired. As such, a need exists to develop a process for making a catalyst from a boehmite material and a catalytic metal precursor without compromising the performance of said catalyst.

SUMMARY OF THE INVENTION

In an embodiment, a method is provided for forming a highly active Fischer-Tropsch catalyst (FT catalyst) using boehmite having a particular average crystallite size. In this method, a support material comprising boehmite is contacted with a catalytic metal-containing compound to form a catalyst precursor. The boehmite is selected to have a average crystallite size preferably in the range of from about 4 nanometers (nm) to about 30 nm, more preferably in the range of from about 6 nm to about 30 nm, still more preferably in the range of from about 8 nm to about 30 nm, and yet still more preferably in the range of from about 10 to about 20 nm. Using boehmite having these average crystallite size provides an FT catalyst exhibiting good performance.

An alternate embodiment comprises forming a highly active FT catalyst using at least two boehmite materials with different average crystallite sizes, wherein at least one of boehmite materials has an average crystallite size preferably in the range of from about 8 nm to about 30 nm, more preferably in the range of from about 8 nm to about 20 nm. A preferred embodiment comprises forming a highly active FT catalyst comprises using a first boehmite material having a first average crystallite size and a second boehmite material having a second average crystallite size. The first average crystallite size is preferably at least 1 nm smaller than the second average crystallite size.

The foregoing methods for forming the FT catalyst further include treating the catalyst precursor to obtain a catalytic metal from the catalytic metal-containing compound and to obtain a catalyst support from the support material comprising boehmite. More specifically, the catalyst precursor is calcined to convert at least a portion of the catalytic-metal containing compound to an oxide of the metal (i.e., a metal oxide). The calcination also transforms the support material comprising boehmite either partially or totally, preferably totally, to a stabilized aluminum oxide structure, thereby forming a catalyst support having desirable physical properties (e.g., high pore volume and high surface area). The metal oxide disposed on the catalyst support is then optionally reduced to form a catalytic metal such as cobalt.

The present invention further includes a FT catalyst made by the method described above and a process for using the FT catalyst to convert syngas to hydrocarbons. In this process, a FT catalyst is contacted with a feed stream comprising carbon monoxide and hydrogen in a reaction zone to produce one or more hydrocarbons. The FT catalyst is made by the method described above. That is, the FT catalyst is prepared from a boehmite support material having an average crystallite size in the range of from about 4 nm to about 30 nm. It is believed that the optimum average crystallite size of a boehmite support material for producing a good FT catalyst is from about 10 nm to about 20 nm.

Alternatively, the FT catalyst may be prepared from a mixture of at least two boehmite materials with different average crystallite sizes in the range of about 4 to 30 nm, wherein the difference between the average crystallite sizes is at least 1 nm, preferably at least 3 nm, more preferably more than 5 nm. The proportion of the at least two boehmite materials with different average crystallite sizes depends on the desired properties of stabilized aluminum oxide porous structure. This FT catalyst has catalytic properties equal to or superior than those of a FT catalyst prepared from a single boehmite support material. The resulting FT catalysts are highly active and advantageously provides for high conversion of the carbon monoxide reactant and high selectivity of the $C_5^+$ hydrocarbons during the FT reaction.

DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
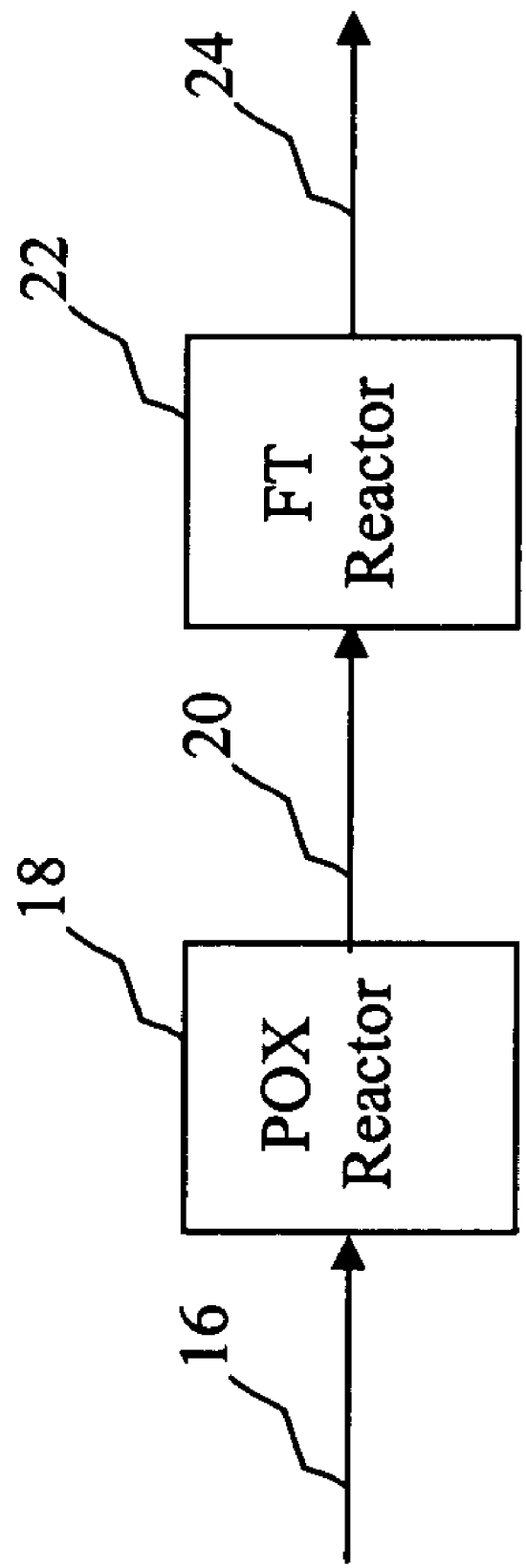
FIG. 1 is a process flow diagram of an embodiment of the present invention, wherein a Fischer-Tropsch catalyst of the present invention is contacted with a feed stream comprising syngas in a Fischer-Tropsch reactor to produce hydrocarbons.

According to an embodiment, a Fischer-Tropsch catalyst includes an active catalytic metal and a support. The active catalytic metal is preferably uniformly dispersed throughout the support. The support comprises a boehmite material having an average crystallite size ranging from about 4 nm to about 30 nm, preferably ranging from about 6 nm to about 30 nm, more preferably ranging from about 8 nm to about 30 nm, and most preferably ranging from about 10 nm to about 20 nm.

In alternate embodiments, the support comprises at least two boehmite materials with different average crystallite sizes, wherein each average crystallite size is preferably in the range of from about 4 nm to about 30 nm. Preferably, the support comprises two boehmite materials having different average crystallite sizes, i.e., first and second average crystallite sizes. The first average crystallite size should be at least 1 nm smaller, preferably at least 3 nm smaller, more preferably at least 5 nm smaller, than the second average crystallite size. Without intending to be limited by theory, it is believed that mixing boehmite materials of different average crystallite sizes helps improve the attrition resistance and/or the hydrothermal stability of the resulting FT catalysts.

It has been surprisingly discovered that a mixture of equal amounts (by weight) of two boehmite materials with different average crystallite sizes of 10 and 15 nm forms a FT catalyst with relatively high activity, good selectivity, good attrition resistance, and good catalytic stability, all of which are equal to or superior than catalysts derived from a boehmite material with a single crystallite of 10 nm or 15 nm. Similarly, mixtures containing a small weight fraction of a boehmite material with an average crystallite size of about 4 nm and a large weight fraction of a boehmite material with an average crystallite size of 10 or 15 nm form FT catalysts with excellent catalytic performance.

Therefore, in one preferred embodiment, the first average crystallite size is preferably in the range of from about 4 nm to about 15 nm, more preferably in the range of from about 8 nm to about 12 nm. The second average crystallite size is preferably in the range of from about 10 nm to about 30 nm, more preferably in the range of from about 12 nm to about 20 nm.

In another embodiment, the first average crystallite size is preferably in the range of from about 4 nm to about 10 nm, more preferably in the range of from about 4 nm to about 8 nm. The second average crystallite size is preferably in the range of from about 8 nm to about 30 nm, more preferably in the range of from about 10 nm to about 15 nm.

In yet an alternate embodiment, the first average crystallite size is preferably in the range of from about 8 nm to about 20 nm, more preferably in the range of from about 10 nm to about 20 nm. The second average crystallite size is preferably in the range of from about 20 nm to about 30 nm, more preferably in the range of from about 25 nm to about 30 nm.

The catalytic metal is a metal that, in its active form, has catalytic activity for the FT reaction. Suitable metals include but are not limited to Group 8 metals such as iron (Fe), ruthenium (Ru), and osmium (Os), Group 9 metals such as cobalt (Co), rhodium (Rh), and iridium (Ir), Group 10 metals such as nickel (Ni), palladium (Pd), and platinum (Pt), and the metals molybdenum (Mo), rhenium (Re), and tungsten (W). The catalytic metal comprises preferably iron, cobalt, nickel, ruthenium, and combinations thereof, and more preferably comprises cobalt.

The FT catalyst preferably contains a catalytically effective amount of the catalytic metal. The amount of catalytic metal present in the FT catalyst may vary widely. For example, when the catalytic metal is cobalt, the FT catalyst may comprise from about 1 to 50 weight (wt.) % cobalt based on the total weight of the catalyst composition, preferably from about 5 wt. % to about 40 wt. %, more preferably from about 10 to about 37 wt. %, and most preferably from about 15 wt. % to about 35 wt. %. Alternatively, when the catalytic metal is iron, the FT catalyst preferably comprises from about 5 wt. % to about 50 wt. % iron based on the total weight of the catalyst composition, preferably from about 10 wt. % to about 45 wt. %, and most preferably about 20 wt. % to about 40 wt. %. Alternatively, when the catalytic metal is ruthenium, the catalyst preferably has a nominal composition including from about 0.01 to about 5 wt. % ruthenium, preferably from about 0.5 to about 4 wt. % ruthenium, more preferably from about 1 to about 3 wt. % ruthenium. Unless otherwise indicated, all weight percents (%) used throughout the specification are by total weight of the catalyst.

The catalytic metal is preferably in a reduced, metallic state when it is employed in the Fischer-Tropsch process. However, it will be understood that the catalytic metal may be present in the form of a metal compound, such as a metal oxide, a metal hydroxide, and the like. The catalytic metal is preferably uniformly dispersed throughout the support. However, the catalytic metal may also be present at the surface of the support, in particular on the surface or within a surface region of the support, or the catalytic metal may be non-homogeneously dispersed onto the support.

Optionally, the catalyst may also include at least one promoter for improving a measure of the performance of the catalyst, such as productivity, lifetime, selectivity, reducibility, or regenerability. Suitable promoters vary with the catalytic metal and may be selected from Groups 1–15 of the Periodic Table. A promoter may be present in an amount to provide a weight ratio of elemental promoter:elemental catalytic metal of from about 0.00005:1 to about 0.5:1, preferably from about 0.0005:1 to about 0.25:1 (dry basis). When the promoter comprises a metal from Groups 7, 8, 9, and 10 of the Periodic Table such as rhenium, ruthenium, platinum, or palladium, the weight ratio of elemental promoter:elemental catalytic metal is preferably between about 0.00005:1 and about 0.05:1. A promoter may be in elemental form, or alternatively, a promoter may be present in an oxide compound or in an alloy containing the catalytic metal.

By way of example and not limitation, when the catalytic metal is cobalt, suitable promoters include Group 1 elements such as potassium (K), lithium (Li), sodium (Na), and cesium (Cs), Group 2 elements such as calcium (Ca), magnesium (Mg), strontium (Sr), and barium (Ba), Group 3 elements such as scandium (Sc), yttrium (Y), and lanthanum (La), Group 4 elements such as titanium (Ti), zirconium (Zr), and hafnium (Hf), Group 5 elements such as vanadium (V), niobium (Nb), and tantalum (Ta), Group 6 elements such as molybdenum (Mo) and tungsten (W), Group 7 elements such as rhenium (Re) and manganese (Mn), Group 8 elements such as ruthenium (Ru) and osmium (Os), Group 9 elements such as rhodium (Rh) and iridium (Ir), Group 10 elements such as platinum (Pt) and palladium (Pd), Group 11 elements such as silver (Ag) and copper (Cu), Group 12 elements such as zinc (Zn), cadmium (Cd), and mercury (Hg), Group 13 elements such as gallium (Ga), indium (In), thallium (Tl), and boron (B), Group 14 elements such as tin (Sn) and lead (Pb), and Group 15 elements such as phosphorus (P), bismuth (Bi), and antimony (Sb).

When the catalytic metal is cobalt, the promoter is preferably selected from among rhenium, ruthenium, platinum, palladium, boron, silver, and combinations thereof. When the catalyst includes rhenium as a promoter, the rhenium is preferably present in the catalyst in an amount of from about 0.001 wt. % to about 5 wt. %, more preferably from about 0.01 wt. % to about 2 wt. %, and most preferably from about 0.2 wt. % to about 1 wt. %. When the catalyst includes ruthenium as a promoter, the ruthenium is preferably present in the catalyst in an amount from about 0.0001 wt. % to about 5 wt. %, more preferably from about 0.001 wt. % to about 1 wt. %, most preferably from about 0.01 wt. % to about 1 wt. %. When the catalyst includes platinum as a promoter, the platinum is preferably present in the catalyst in an amount from about 0.00001 wt. % to about 5 wt. %, more preferably from about 0.0001 wt. % to about 1 wt. %, and most preferably from about 0.0005 wt. % to about 1 wt. %. When the catalyst includes palladium as promoter, the palladium is preferably present in the catalyst in an amount from about 0.001 wt. % to about 5 wt. %, more preferably from about 0.01 wt. % to about 2 wt. %, and most preferably from about 0.2 wt. % to about 1 wt. %. When the catalyst includes silver as a promoter, the catalyst preferably has a nominal composition including from about 0.05 wt. % to about 10 wt. % silver, more preferably from about 0.07 wt. % to about 7 wt % silver, and most preferably from about 0.1 wt. % to about 5 wt. % silver. When the catalyst includes boron as a promoter, the catalyst preferably has a nominal composition including from about 0.025 wt. % to about 2 wt. % boron, more preferably from about 0.05 to about 1.8 wt. % boron, and most preferably from about 0.075 wt. % to about 1.5 wt % boron. It will be understood that each of the ranges, such as of ratio or weight %, herein is inclusive of its lower and upper values.

Further, when the catalytic metal is iron, suitable promoters include but are not limited to copper (Cu), potassium (K), silicon (Si), zirconium (Zr), silver (Ag), lithium (Li), sodium (Na), rubidium (Rb), cesium (Cs), magnesium (Mg), calcium (Ca), strontium (Sr), and barium (Ba). When the catalytic metal is iron, the catalyst preferably includes potassium as a promoter. The potassium is preferably present in the supported iron-based catalyst in an amount to provide a nominal catalyst composition including from about 0.1 wt. % to about 10 wt. % potassium. Alternatively or in combination, when the catalytic metal is iron, the catalyst includes copper as a promoter. The copper is preferably present in the supported iron-based catalyst in an amount to provide a nominal catalyst composition containing from about 0.1 wt. % to about 10 wt. % copper. The silver is preferably present in the supported iron-based catalyst in an amount to provide a nominal catalyst composition containing from about 0.5 wt. % to about 5 wt. % Ag. Lithium is preferably present in the supported iron-based catalyst in an amount to provide a nominal catalyst composition containing from about 0.5 wt % to about 4 wt % Li.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% rhenium by weight, more preferably between about 0.01 and about 0.5% rhenium by weight, still more preferably between about 0.05 and about 0.5% rhenium by weight.

As used herein, a nominal composition is preferably a composition specified with respect to an active catalyst. The active catalyst may be either fresh or regenerated. The nominal composition may be determined by experimental elemental analysis of an active catalyst. Alternatively, the nominal composition may be determined by numerical analysis from the known amounts of catalytic metal, promoter, and support used to make the catalyst. It will be understood that the nominal composition as determined by these two methods will typically agree within conventional accuracy.

The supported FT catalyst of the present invention is prepared by first contacting a support material with a catalytic-metal containing compound. The support material preferably comprises at least one boehmite material.

The boehmite is preferably synthetic boehmite. Synthetic boehmite includes any boehmite not derived from ore. Any of the methods known to those skilled in the art may be used to create the synthetic boehmite. For example, synthetic boehmite may be made by a gellation method. In particular, maturation of an aluminum hydroxide, $Al(OH)_3$, gel at pH>12 and at 80° C. produces synthetic boehmite.

Alternatively, although less preferred, the boehmite may be derived as natural boehmite. Minor variations, such as impurities, may exist between various commercial sources of natural boehmite. Such impurities include, for example, elements or compounds derived from other materials contained in natural sources of boehmite. Thus, natural boehmite may include minor amounts of any one or combination of iron, titanium, and silicon. However, it is believed that any conventional natural boehmite is suitable for the present invention.

The boehmite, either natural boehmite or synthetic boehmite, preferably is porous. The average pore size is preferably larger than 4 nm. The average surface area, including the surface of the pores, is preferably larger than 50 $m^2$. Further, the boehmite has an average crystallite size in the range of from about 4 nm to about 30 nm, preferably from about 6 nm to about 30 nm, more preferably from about 8 nm to about 25 nm, and most preferably from about 10 nm to about 20 nm. According to some embodiments, the boehmite may be spray-dried boehmite. Alternatively, the boehmite may be extruded boehmite. A commercial boehmite is available, for example, from Alcoa Inc., Sasol Limited, and W.R. Grace Co.

Additionally, the boehmite may comprise a mixture of boehmite materials with various average crystallite sizes.

When two boehmite materials are used, their average crystallite sizes should differ by at least 1 nm, preferably by at least 3 nm, more preferably by at least 5 nm. The boehmite may comprise a mixture of a first boehmite material having a first average crystallite size and a second boehmite material having a second average crystallite size, wherein the first average crystallite size is at least about 1 nm smaller, preferably at least 3 nm smaller, more preferably by at least 5 nm smaller, than the second average crystallite size.

In one mixed-boehmite preferred embodiment, the first average crystallite size is preferably in the range of from about 4 nm to about 15 nm, more preferably in the range of from about 8 nm to about 12 nm. The second average crystallite size is preferably in the range of from about 10 nm to about 30 nm, more preferably in the range of from about 12 nm to about 20 nm. In this preferred mixed-boehmite embodiment, the weight ratio of the first boehmite material with the first average crystallite size to the second boehmite material with the second average crystallite size is preferably from about 1:99 to about 99:1, more preferably from about 99:1 to about 1:99, still more preferably from about 10:90 to about 90:10, and most preferably from about 25:75 to about 75:25. A not-limiting example, for illustration purpose only, would comprise mixing about equal weights of two boehmites with respective average crystallite sizes of about 10 nm and about 15 nm.

In another mixed-boehmite embodiment, the first average crystallite size is preferably in the range of from about 4 nm to about 10 nm, more preferably in the range of from about 4 nm to about 8 nm. The second average crystallite size is preferably in the range of from about 8 nm to about 30 nm, more preferably in the range of from about 10 nm to about 15 nm. It is preferred in this other mixed-boehmite embodiment that the first boehmite with the first average crystallite size has a smaller weight fraction than the boehmite with the second average crystallite size. The weight ratio of the first boehmite material with the first average crystallite size to the second boehmite material with the second average crystallite size is preferably from about 1:99 to about 20:80, more preferably from about 1:99 to about 10:90, still more preferably from about 1:99 to about 5:95. A not-limiting example, for illustration purpose only, would comprises mixing less than about 10% by weight of a boehmite with an average crystallite size of about 4 nm and more than about 90% by weight of a boehmite with an average crystallite size of 15 nm.

In yet an alternate mixed-boehmite embodiment, the first average crystallite size is preferably in the range of from about 8 nm to about 20 nm, more preferably in the range of from about 10 nm to about 20 nm. The second average crystallite size is preferably in the range of from about 20 nm to about 30 nm, more preferably in the range of from about 25 nm to about 30 nm. It is preferred in this alternate mixed-boehmite embodiment that the boehmite with the second average crystallite size has a smaller weight fraction than the boehmite with the first average crystallite size. The weight ratio of the first boehmite material with the first average crystallite size to the second boehmite material with the second average crystallite size is preferably from about 99:1 to about 80:20, more preferably from about 99:1 to about 90:10, still more preferably from about 99:1 to about 95:5. A not-limiting example, for illustration purpose only, would comprise mixing more than about 90% by weight of a boehmite with an average crystallite size of about 15 nm and less than about 10% by weight of a boehmite with an average crystallite size of 30 nm.

When a combination of boehmite materials is used, the boehmite materials are preferably mixed prior to application of the catalytically active metal and/or optional promoters. Hereinafter, boehmite refers to a single boehmite material and also mixtures of two or more boehmite materials with different average crystallite sizes.

The support material preferably comprises a boehmite, which is non-dispersible in aqueous solution. A non-dispersible boehmite may be obtained from a dispersible boehmite by preheating the boehmite at a temperature of from about 250° C. to about 350° C. for a period of from about 20 minutes to about 24 hours, preferably in an oxidizing atmosphere. The temperature is preferably selected to be lower than the temperature required for the formation of a gamma-alumina phase. The dispersible boehmite may be a commercial boehmite as received or as modified, e.g., by spraying, or alternatively treating without affecting dispensability. According to some embodiments, the boehmite is dispersible in acid. The acid-dispersible boehmite may be a commercial acid-dispersible boehmite. Without intending to be limited by theory, it is believed that the acid dispensability confers to the support a greater stability towards the presence of water, especially of steam.

According to one preferred embodiment, the support material comprising boehmite can be pre-treated prior to application of the catalytically active metal and/or optional promoters. The preheating of the boehmite is preferably done at a temperature below the temperature of phase transformation from boehmite to gamma-alumina When the boehmite is in the form of a powder, the particle size range may also be adjusted to a desirable range. The particle size distribution may be modified, for example, by dissolving the boehmite in a solvent, preferably water, spray-drying the solution of boehmite, and drying the spray-dried boehmite. The spray-dried boehmite preferably has a particle size range of from about 20 microns to about 200 microns. Accordingly, the pretreatment can comprise spray-drying of a solution of the boehmite support material, preheating of the boehmite support material, or combinations thereof. When the support material comprising boehmite is pre-treated by spray-drying and preheating, the spray-drying step is preferably performed before the preheating step.

Spray-drying may comprise mixing the support material comprising boehmite in a solvent, preferably in an aqueous solution to achieve a solid content of from about 20% to about 40% by weight of the total solution; and passing the mixture through a spray-drier with an inlet temperature of from about 200° C. to about 425° C. and an outlet temperature of from about 100° C. to about 140° C.

Preheating may comprise exposing the support material comprising boehmite in an atmosphere to a temperature preferably ranging from about 250° C. to about 350° C., more preferably from about 300° C. to about 350° C., and most preferably from about 315° C. to about 335° C. The preheating temperature is selected such that substantially all the boehmite in the sample is retained. The atmosphere can comprise any inert gas, such as nitrogen, molecular oxygen, or a mixture thereof. Preferably, the atmosphere is oxidizing. More preferably, the atmosphere comprises air. Preheating at about 325° C. in air retains all the boehmite in the sample. The resulting preheated support material comprising boehmite is non-dispersible boehmite, where non-dispersible refers to non-dispersion in aqueous solution. Without intending to be limited by theory, it is believed that preheating boehmite at a temperature of from about 250° C. to about 350° C. produces a substantially non-dispersible boehmite.

Any suitable methods known in the art may be utilized to deposit a catalytic metal-containing compound on the support material containing boehmite, thereby forming a catalyst precursor. For example, the support material may be impregnated with the catalytic metal-containing compound, or the catalytic metal-containing compound may be precipitated onto the support material. When a promoter is used, a promoter-containing compound may be added to the support material in a separate step. Alternatively, a promoter-containing compound may be added to the support material concurrent with, e.g., in the same solution as, at least a portion of the catalytic metal-containing compound.

In a preferred embodiment, a catalyst precursor is prepared by impregnating the support material with a solution containing a catalytic metal-containing compound. When a promoter is used, the solution may further contain a promoter-containing compound. Suitable solvents include water and organic solvents, e.g., toluene, methanol, and ethanol. Those skilled in the art would be able to select the most suitable solvent for a given compound. The catalytic metal-containing compound preferably is in the form of a salt of a catalytic metal. Thus, one method of preparing a FT catalyst is by incipient wetness impregnation of the support material with an aqueous solution of a soluble metal salt such as nitrate, acetate, or acetylacetonate. Preferably, the metal salt is dissolved in a minimal amount of solvent sufficient to fill the pores of the support material. Alternatively, the support material may be impregnated with a zero valent compound of a catalytic metal, such as a cobalt carbonyl (e.g., $CO_2(CO)_8$, $CO_4(CO)_{12}$), or with a molten metal salt such as a molten metal nitrate (e.g., $Co(NO_3)_2 \cdot 6H_2O$).

Those skilled in the art would be able to select the most suitable catalytic-metal containing compound for use in preparing a catalyst precursor. For example, suitable cobalt-containing precursor compounds include but are not limited to hydrated cobalt nitrate (e.g. cobalt nitrate hexadydrate), cobalt carbonyl, cobalt acetate, cobalt acetylacetonate, and cobalt oxalate. Hydrated cobalt nitrate, cobalt carbonyl, and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent. Suitable iron-containing precursor compounds include, for example, hydrated iron nitrate, iron carbonyl, iron acetate, iron acetylacetonate, iron oxalate, and the like. Hydrated iron nitrate, iron acetate, and iron oxalate are exemplary of iron-containing compounds soluble in water. Iron carbonyl and iron acetylacetonate are exemplary of iron-containing compounds soluble in organic solvents.

Furthermore, those skilled in the art would be able to select the most suitable promoter-containing compound for use in preparing a catalyst precursor. Suitable rhenium-containing precursor compounds soluble in water are preferred and include, for example, perrhenic acid, ammonium perrhenate, rhenium pentacarbonyl chloride, rhenium carbonyl, and the like. Suitable ruthenium-containing precursor compounds soluble in water include for example ruthenium carbonyl, $Ru(NH_3)_6 \cdot Cl_3$, Ru(III)2,4-pentanedionoate, ruthenium nitrosyl nitrate, and the like. Water-soluble ruthenium-containing precursor compounds are preferred. Suitable platinum-containing precursor compounds soluble in water include, for example, $Pt(NH_3)_4(NO_3)_2$ and the like. Alternatively, the platinum-containing precursor may be soluble in an organic solvent, such as platinum acetyl acetonate soluble in acetone. Suitable boron-containing precursor compounds soluble in water include, for example, boric acid, and the like. Alternatively, the boron-containing precursor may be soluble in an organic solvent. Suitable silver-containing precursor compounds soluble in water include, for example, silver nitrate (AgNO3) and the like. Alternatively, the silver-containing precursor may be soluble in an organic solvent. Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

Subsequent to impregnating the support material to form a catalyst precursor, the precursor may be subjected to a drying process. Drying the catalyst precursor is preferably performed at a temperature of from about 80 to 150° C. for a period of about 0.5 to 24 hours at a pressure of about 0 to 10 atm, more preferably about 1 to 5 atm, and most preferably about 1 atm. After the drying step, the catalyst precursor is preferably calcined, e.g., by heating in an oxidizing atmosphere, to decompose at least a significant portion of the catalytic metal-containing compound to a metal oxide. The calcination step also transforms either partially or totally, preferably totally, the boehmite of the support material to a stabilized aluminum oxide structure, thereby forming a catalyst support that is less reactive than gamma-alumina.

When the catalytic metal includes cobalt, the calcination preferably proceeds at a temperature of at least 200° C. and less than the temperature at which loss of support surface area is appreciable. It is believed that at temperatures above 900° C., loss of support surface area is appreciable. The calcination temperature preferably ranges from about 200° C. to about 900° C., more preferably from about 350° C. to about 800° C., still more preferably from about 450° C. to about 800° C., and most preferably from about 450° C. to about 755° C. Preferably, the calcination is allowed to proceed for a period of about 0.5 to 24 hours at a pressure of about 0 to 10 atm, more preferably about 1 to 5 atm, and most preferably about 1 atm. When a multi-step impregnation is required to form the catalyst precursor, calcination may be performed after each impregnation of the catalytic metal-containing compound and of the promoter-containing compound, or it may be performed after all impregnations have been completed. However, any calcination after the first calcination preferably proceeds at a temperature of not more than about 500° C., more preferably not more than about 450° C., and most preferably not more than about 350° C.

The impregnation, drying, and calcination steps may be repeated, for example, until the desired catalytic metal loading is obtained. Each impregnation step may include impregnation of any one or combination of catalytic metal-containing compound and promoter-containing compound. Each subsequent step of drying may proceed at a different temperature from any earlier steps of drying. Further, each subsequent step of calcination may proceed at a different temperature from any earlier steps of calcination.

The resulting catalyst precursor, which includes a metal oxide on a support comprising a stabilized aluminum oxide structure obtained from boehmite, is desirably converted to an active catalyst before using the catalyst to facilitate the FT reaction. The catalyst precursor can be activated via a reduction treatment in the presence of a reducing gas at an elevated temperature. The reducing gas preferably includes hydrogen ($H_2$). In the reduction treatment, the oxygen atoms in the metal oxide (e.g., $Co_3O_4$) reacts with $H_2$, thereby forming elemental metal (i.e., the catalytic metal) and water in accordance with the following reaction:

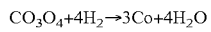

$$Co_3O_4 + 4H_2 \rightarrow 3Co + 4H_2O$$

The reduction of the metal oxide may be achieved by exposing the catalyst precursor to a reducing atmosphere such as a $H_2$-containing atmosphere at a temperature of from about 75 to 500° C. for about 0.5 to 50 hours at a pressure of about 1 to 75 atm. Pure $H_2$ may be used in the reduction treatment, as may a mixture of $H_2$ and other gases known in the art, such as nitrogen ($N_2$), carbon monoxide (CO), and carbon dioxide ($CO_2$). Reduction with pure $H_2$ and reduction with a mixture of $H_2$ and CO are preferred. The amount of $H_2$ may range from about 1% to about 100% by volume.

The metal catalyst described above may be used to facilitate any reaction requiring a reduced metal catalyst. That is, the catalyst may be used with various reactants to promote the production of different products. In some embodiments, the catalyst described above is used in a FT process. The feed gases charged to the FT process comprise hydrogen and carbon monoxide. The $H_2$/CO mixture used as feedstock to the FT process $H_2$/CO mixtures suitable as a feedstock for conversion to hydrocarbons according to the process of this invention can be obtained from any source known to those skilled in the art, including, for example, from conversion of of natural gas or light hydrocarbons of five carbons atoms or less by steam reforming, dry ($CO_2$) reforming, auto-thermal reforming, advanced gas heated reforming, partial oxidation, catalytic partial oxidation, or other processes known in the art; or from coal by gasification; or from biomass. In addition the feed gases can comprise off-gas recycle from the present or another Fischer-Tropsch process. It is preferred that the molar ratio of hydrogen to carbon monoxide in the feed be greater than 0.5:1 (e.g., from about 0.67 to about 2.5). Preferably, when cobalt, nickel, and/or ruthenium catalysts are used, the feed gas stream contains hydrogen and carbon monoxide in a molar ratio of about 1.6:1 to about 2.3:1. Preferably, when iron catalysts are used, the feed gas stream contains hydrogen and carbon monoxide in a molar ratio between about 1.4:1 and about 2.2:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides. In a preferred embodiment shown in FIG. 1, a portion of the $H_2$/CO mixture used as feedstock to the FT process is obtained from a partial oxidation reactor, more preferably a catalytic partial oxidation reactor.

Turning to FIG. 1, a feed stream 16 comprising one or more light alkanes, preferably comprising methane, is fed to a partial oxidation (POX) reactor 18 for conversion to syngas. Feed stream 16 may be a natural gas stream comprising alkanes such as methane, propane, and ethane. Alternatively, feed stream 16 may be a stream recovered from a gas plant (not shown) used to process natural gas into different fractions. Preferably, feed stream 16 is the methane fraction recovered from a gas plant. In POX reactor 18, an oxygen-containing gas (e.g., pure oxygen, oxygen diluted with an inert gas, air, or oxygen-enriched air) is combined with the methane over a catalyst disposed within POX reactor 18, which is preferably a short contact time reactor (SCTR), e.g., a millisecond contact time reactor. The partial oxidation of the methane to syngas proceeds by the following exothermic reaction:

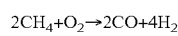

$$2CH_4 + O_2 \rightarrow 2CO + 4H_2$$

The POX reactor 18 contains any suitable catalyst for promoting the conversion of hydrocarbon gas to syngas. The catalyst comprises a wide range of catalytically active components, e.g., palladium, platinum, rhodium, iridium, osmium, ruthenium, nickel, chromium, cobalt, cerium, lanthanum, and mixtures thereof. A syngas stream 20 comprising $H_2$ and CO is recovered from POX reactor 18.

Within POX reactor 18, a methane-containing gas and an oxygen-containing gas are contacted with the catalyst in a reaction zone that is maintained at conversion-promoting promoting conditions effective to produce $H_2$ and CO. Suitable partial oxidation processes, conditions, and catalysts for use with the present invention are disclosed in, for example, U.S. Pat. Nos. 6,402,989 and 6,409,940; published PCT application WO 02/20395; and published U.S. Pat. Application 2002-0006374 and 2002-0009407, each of which is incorporated herein by reference in its entirety.

In alternative embodiments, POX reactor 18 may also comprise or may be substituted with other syngas production units capable of converting methane or natural gas to synthesis gas, such as a steam reformer and/or an auto-thermal reformer. Steam reforming (SR) entails endothermically reacting light hydrocarbons and steam over a catalyst contained within a plurality of externally heated tubes mounted in a furnace. Auto-thermal reforming (ATR) employs a combination of steam reforming and partial oxidation. More particularly, the endothermic heat required for the steam reforming reaction is obtained from the exothermic partial oxidation reaction.

As also shown in FIG. 1, syngas stream 20, which contains $H_2$ and CO, is fed to a FT reactor 22 in which the catalyst of the present invention is disposed. In addition to the $H_2$ contained in syngas stream 20, supplemental $H_2$ may also be provided to FT reactor 22. The molar ratio of $H_2$ to CO in syngas stream 20 is preferably greater than 0.5:1 and is more preferably in the range of from about 0.67:1 to about 2.5:1. When the FT catalyst contains cobalt, nickel, and/or ruthenium, the molar ratio of $H_2$ to CO is preferably in the range of from about 1.6:1 to about 2.3:1. On the other hand, when the FT catalyst contains iron, the molar ratio of $H_2$ to CO is preferably in the range of from about 1.4:1 to about 2.2:1. Syngas stream 20 may also contain $CO_2$. Syngas stream 20 desirably contains no, or an insignificant concentration of, compounds or elements such as poisons that would have a deleterious effect on the FT catalyst. In particular, syngas stream 20 should be pre-treated to ensure that any sulfur or nitrogen compounds, such as hydrogen sulfide, hydrogen cyanide, ammonia, and carbonyl sulfides, possibly present therein are reduced to very low concentrations.

Syngas stream 20 is contacted with the FT catalyst in a reaction zone within FT reactor 22. Any suitable reactor configuration that allows contact between the syngas and the FT catalyst may be employed for FT reactor 22. A conventional design may be employed for the configuration of FT reactor 22. For example, FT reactor 22 may be a fixed bed reactor, a fluidized bed reactor, a slurry bubble column reactor, or an ebulliating bed reactor. The FT reactor 22 is preferably a slurry bubble column reactor, wherein the FT catalyst particles are suspended in a liquid, e.g., molten hydrocarbon wax, by the motion of bubbles of syngas sparged into the bottom of the reactor. As the gas bubbles rise through the reactor, the syngas is absorbed into the liquid where it diffuses to the catalyst for conversion to hydrocarbons. Gaseous products enter the gas bubbles and are collected at the top of the reactor. Liquid products are recovered from the suspended liquid using different techniques such as filtration, settling, hydrocyclones, and magnetic techniques. Cooling coils immersed in the slurry remove heat generated by the reaction. Alternatively, FT reactor 22 may be a fixed bed reactor in which the FT catalyst is held in a fixed bed that is suspended within the reactor vessel. The syngas flowing through the reactor vessel contacts the FT catalyst contained in the fixed bed. The reaction heat is removed by passing a cooling medium around the tubes or vessels that contain the fixed bed.

The reaction zone is maintained at conversion-promoting conditions effective to produce the desired hydrocarbon liquids, which exit FT reactor 22 via product stream 24. The FT process is preferably run in a continuous mode. In this mode, the gas hourly space velocity through the reaction zone may range from about 50 $hr^{-1}$ to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is determined at standard conditions i.e., at the standard pressure of 1 atm (101 kPa) and the standard temperature of 0° C. The reaction zone volume is defined by the portion of the reaction vessel volume wherein the reaction takes place, which is occupied by a gaseous phase comprising reactants, products and/or inerts; a liquid phase comprising liquid/wax products and/or other liquids; and a solid phase comprising a catalyst. The reaction zone temperature may be in the range of from about 160° C. to about 300° C. Preferably, the reaction zone is operated at a reaction zone temperature of from about 190° C. to about 260° C.; more preferably from about 200° C. to about 230° C. The reaction zone pressure is preferably in the range of from about 80 psia (552 kPa) to about 1000 psia (6895 kPa), more preferably from about 80 psia (552 kPa) to about 800 psia (5515 kPa), and still more preferably from about 140 psia (965 kPa) to about 750 psia (5170 kPa). Most preferably, the reaction zone pressure is from about 250 psia (1720 kPa) to about 650 psia (4480 kPa).

As described previously, the FT catalyst contained within FT reactor 22 is prepared from one or more boehmite materials having an average crystallite size of from about 4 nm to about 30 nm, as described earlier. When a single boehmite is used, the boehmite preferably has an average crystallite size in the range of from about 6 nm to about 30 nm, more preferably from about 8 nm to about 25 nm, and most preferably from about 10 nm to about 20 nm. When a mixture of boehmite materials with various average crystallite sizes is used, the mixed boehmite should comprise a mixture of a first boehmite material having a first average crystallite size and a second boehmite material having a second average crystallite size, wherein the first average crystallite size is at least about 1 nm smaller, preferably at least 3 nm smaller, more preferably by at least 5 nm smaller, than the second average crystallite size. Several mixed-boehmite embodiments are envisioned and have been described earlier. The resulting FT catalyst, which has a catalyst support comprising a stabilized aluminum oxide structure derived from a single boehmite material or a mixed-boehmite material, is highly active. The catalyst should have good attrition resistance, and has hydrothermal stability, especially when using a single boehmite material or mixed-boehmite material within the most preferred range of average crystallite size of about 10 to about 20 nm. Further, as shown later in Table 3, the % conversion of the CO reactant and the selectivity of the valuable $C_5^+$ hydrocarbon products are considerably higher when the FT catalyst is formed from boehmite having an average crystallite size of 10 to 20 nm as opposed to when it is formed from boehmite having an average crystallite size of less than 10 nm or greater than 20 nm.

EXAMPLES

The invention having been generally described, the following examples are given as particular embodiments of the invention and to demonstrate the practice and advantages hereof It is understood that the examples are given by way of illustration and are not intended to limit the specification or the claims to follow in any manner.

The first five examples of a FT catalyst were prepared using boehmite having various single average crystallite sizes. The sixth example (a comparative example) was a conventional FT catalyst prepared from gamma-alumina instead of boehmite. The next three examples of a FT catalyst were prepared using a mixture of boehmites having 2 different average crystallite sizes. The final example is of a boehmite support material that was subjected to a pretreatment process. A description of the preparation of these ten examples is provided below.

Example 1

A boehmite alumina support material commercially available from Alcoa, Inc. (Houston, Tex.) under the tradename Hi Q® 502-02 was first pretreated. That is, it was spray-dried by mixing the boehmite alumina support material in deionized water to achieve a solid content of about 35% by weight of the solution. The solution was then passed through a Mobile Minor spray-drier (type H, Model 2000, available from Niro Inc.) having an inlet temperature of about 250° C. and an outlet temperature of about 100° C., such that the spray-drier had a solid outlet flow of from about 40 g/min to about 80 g/min. To finish the pretreatment, the spray-dried boehmite material was then preheated (i.e., pre-calcined in air) at 325° C. for 2 hours at atmospheric pressure.

A multi-step aqueous incipient wetness impregnation method was used to prepare a FT catalyst from the pretreated boehmite support material. A solution was prepared by combining cobalt nitrate hexahydrate $[Co(NO_3)_2.6H_2O]$, tetraamineplatinum(II) nitrate $[(NH_3)4Pt(NO_3)_2]$, and boric acid $[H_3BO_3]$. The pretreated boehmite support material was impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 750° C., followed by holding at this temperature for 4 hours. The above procedure was repeated to obtain the following loading of Co, Pt, and B on the support: 30 wt. % Co; 0.03 wt. % Pt; and 0.5 wt. % B, wherein the weight % is based on the total weight of the final catalyst. However, in the subsequent calcination(s), a lower calcination temperature of 240° C. was used.

Example 2

The procedure of Example 1 was followed except that a boehmite alumina support material commercially available from Sasol North America Inc. (Houston, Tex.) under the tradename Dispal® 23N4-80 was used to prepare the FT catalyst.

Example 3

The procedure of Example 1 was followed except that a boehmite alumina support material commercially available from Sasol under the tradename Dispal® 18N4-80 was used to prepare the FT catalyst.

Example 4

The procedure of Example 1 was followed except that a boehmite alumina support material commercially available from Sasol under the tradename Dispal® 14N4-80 was used to prepare the FT catalyst.

Example 5

The procedure of Example 1 was followed except that a boehmite alumina support material commercially available from Alcoa, Inc. (Houston, Tex.) under the tradename Hi Q® 180E was used to prepare the FT catalyst.

Example 6

A multi-step aqueous incipient wetness impregnation method was used to prepare a FT catalyst. First, a solution was prepared by combining cobalt nitrate hexahydrate $[Co(NO_3)_2.6H_2O]$, tetraamineplatinum(II) nitrate $[(NH_3)4Pt(NO_3)_2]$, and boric acid $[H_3BO_3]$. A gamma-alumina support material commercially available from Sasol under the tradename Puralox®/Catalox® SCCa 5/150 was then impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 240° C., followed by holding at this temperature for 4 hours. The above procedure was repeated to obtain the following loading of Co, Pt, and B on the gamma-alumina support: 25 wt. % Co; 0.03 wt. % Pt; and 0.5 wt. % B, wherein the weight % is based on the total weight of the final catalyst.

Example 7

Equal weights of two boehmite support materials (Sasol Dispal® 23N4-80 and Dispal® 18N4-80A) were dispersed in water, spray dried, and preheated (as described in Example 1) to form a pretreated mixed-boehmite material. Again, a multi-step aqueous incipient wetness impregnation method was used to prepare a FT catalyst. First, a solution was prepared by combining cobalt nitrate hexahydrate $[Co(NO_3)_2.6H_2O]$, tetraamineplatinum(II) nitrate $[(NH_3)4Pt(NO_3)_2]$, and boric acid $[H_3BO_3]$. The mixed-boehmite material was then impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 750° C., followed by holding at this temperature for 4 hours. The above procedure was repeated except that in the subsequent calcination(s), a lower calcination temperature of 240° C. was used. As a result of the calcination, the calcined impregnated mixed-boehmite sample was converted to a catalyst supported on a stabilized aluminum oxide structure; and the catalyst had the following loading of Co, Pt, and B:: 30 wt. % Co; 0.03 wt. % Pt; and 0.5 wt. % B, wherein the weight % is based on the total weight of the final catalyst.

Example 8

The procedure of Example 7 was followed except that two boehmite support materials commercially available from Sasol under the tradenames Disperal® P2 and Dispal® 18N4-80 with respective average boehmite crystallite sizes of 4 nm and 15 nm were dispersed together in water, spray dried, and preheated at 325° C. (as described in Example 1) to form a pretreated mixed-boehmite material comprising 4 wt % of the Disperal® P2 boehmite and 96 wt % of the Dispal® 18N4-80 boehmite.

Example 9

The procedure of Example 7 was followed except that two boehmite support materials commercially available from Sasol under the tradenames Disperal® P2 and Dispal® 23N4-80 with respective average boehmite crystallite sizes of 4 nm and 10 nm were dispersed together in water, spray dried, and preheated (as described in Example 1) to form a pretreated mixed-boehmite material comprising 4 wt % of the Disperal® P2 boehmite and 96 wt % of the Dispal® 23N4-80 boehmite.

Example 10

A boehmite material commercially available from Sasol under the tradename Dispal® 14N4-80 was pretreated. That is, it was spray-dried by mixing the boehmite material in deionized water to achieve a solid content of about 35% by weight of the solution. The solution was then passed through a Mobile Minor spray-drier (type H, Model 2000, available from Niro Inc.) having an inlet temperature of about 250° C. and an outlet temperature of about 100° C., such that the spray-drier had a solid outlet flow of from about 40 g/min to about 80 g/min. To finish the pretreatment, the spray-dried boehmite material was then preheated (i.e., pre-calcined in air) at 325° C. for 2 hours at atmospheric pressure.

Figure 2:
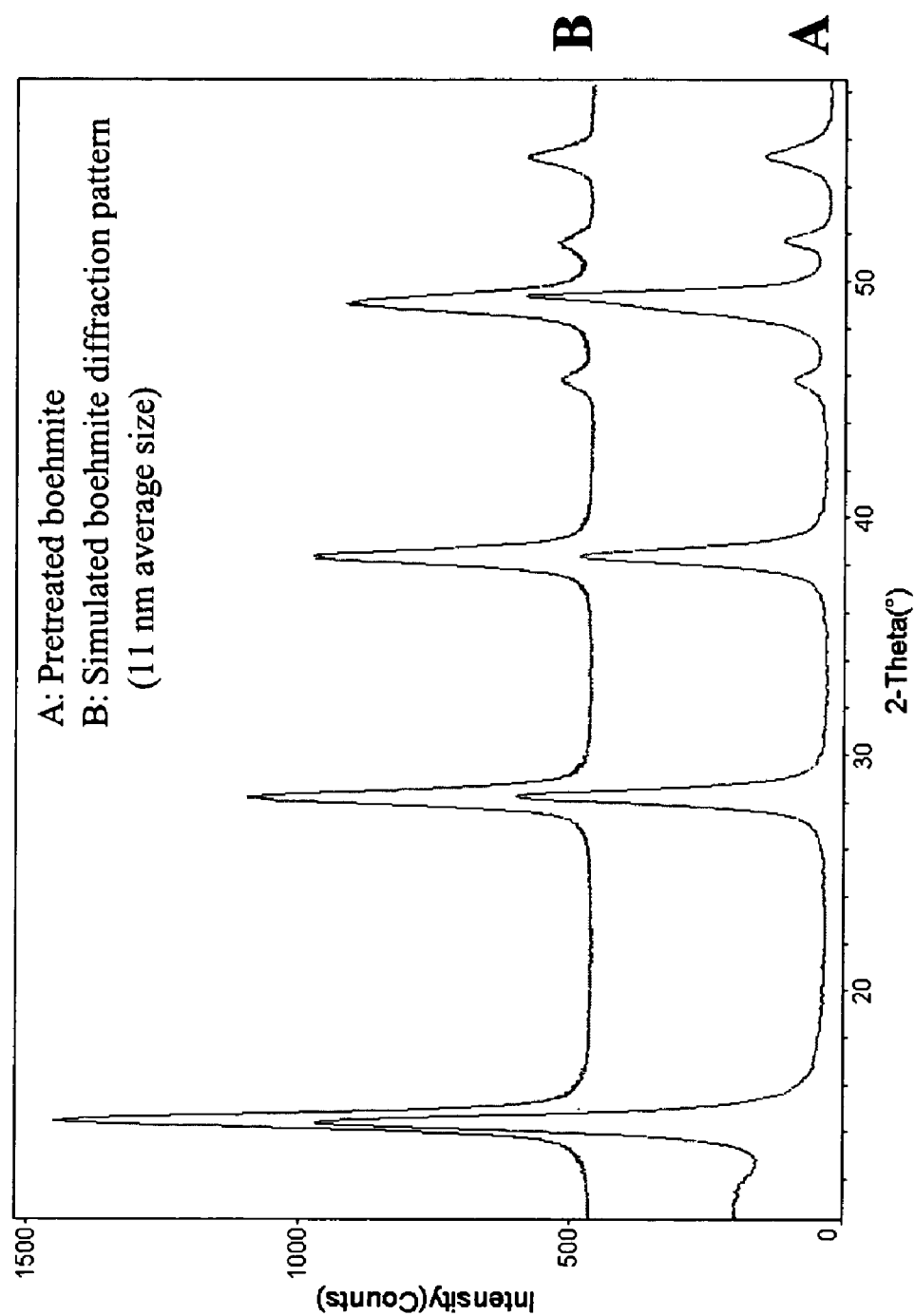
FIG. 2 is a XRD graph of pretreated boehmite and of a simulated boehmite diffraction pattern.

FIG. 2 depicts a XRD graph of the pretreated boehmite material and of a simulated boehmite diffraction pattern. As can be seen in FIG. 2, the diffraction pattern of the pretreated boehmite material is very similar to that of the simulated pattern. Thus, FIG. 2 illustrates that pretreating the boehmite (i.e., preheating at 325° C. for 2 hours at atmospheric pressure) does not convert the boehmite to an aluminum oxide structure.

During the preparation of Example 3 (boehmite with average 15-nm crystallites), the attrition resistance of the support material was tested before and after pretreatment using the ASTM method D-5757-95. After the pretreatment, the pretreated boehmite had a lower attrition index (1.1) compared to the untreated boehmite (3.2), indicating that the pretreated boehmite yielded a more attrition resistant material. Since the deposition of active metals and promoters did not greatly affect the attrition resistance of the deposited support, it is expected that the catalyst prepared with a pretreated boehmite material would have better attrition resistance than the catalysts made with boehmite materials without pretreatment.

Several properties of the boehmite support materials and the FT catalysts prepared therefrom in Examples 1–5 and 7–9 were measured, as shown in respective Tables 1 and 2 below. Those same properties of the gamma-alumina and of the FT catalyst prepared therefrom in Example 6 are also shown in both tables.

The average crystallite size and crystallite cobalt phase were both determined by X-ray diffraction (XRD). The XRD method is disclosed, for example, in Klug & Alexander, *X-ray diffraction procedures for polycrystalline and amorphous materials*, John Wiley & Sons, $2^{nd}$ Edition, 1974, which is incorporated by reference herein. This reference includes the formula that was used to calculate the average crystallite size (page 656).

The BET Surface Area, average pore volume and average pore diameter were measured by the BJH desorption method using $N_2$ as the adsorptive material of commercially available unmodified $\gamma$-$Al_2O_3$ and modified $Al_2O_3$ catalyst supports. Surface area and pore size distribution were obtained on a Micromeritics TriStar 3000 analyzer after degassing the sample at 190° C. in flowing nitrogen for five hours. Surface area was determined by taking ten points in the nitrogen adsorption isotherm between 0.05 and 0.3 relative pressure and calculating the surface area by the standard BET procedure. Pore size distribution was determined from a minimum of 30 points in the nitrogen desorption isotherm and calculated using the BJH model for cylindrical pores. The instrument control and calculations were performed using the TriStar software and are consistent with ASTM D3663-99 entitled "Surface Area of Catalysts and Catalyst Carriers", ASTM D4222-98 entitled "Determination of Nitrogen Adsorption and Desorption Isotherms of Catalysts by Static Volumetric Measurements", and ASTM D4641-94 entitled "Calculation of Pore Size Distributions of Catalysts from Nitrogen Desorption Isotherms". The initial surface area (A) of the catalyst was determined as the surface area of the catalyst structure prior to contact of reactant gas. The pore volume (V) of the catalyst ($N_2$ as adsorptive material) was measured and calculated using the method described above. Average pore size (diameter) was calculated as $4V/A$.

TABLE 1

| Support Type | Support Source | Support Avg. Crystallite Size, nm | Support BET Surface Area, $m^2/g$ | Support Avg Pore Volume, cc/g | Support Avg. Pore Diameter, nm |
|---|---|---|---|---|---|
| Boehmite Hi Q ® 502-02 | Alcoa | 8.4 | 285 | 0.24 | 3.4 |
| Boehmite Dispal ® 23N4-80 | Sasol | 10 | 186 | 0.30 | 6.5 |
| Boehmite Dispal ® 18N4-80 | Sasol | 15 | 133 | 0.30 | 9.1 |
| Boehmite Dispal ® 14N4-80 | Sasol | 25 | 79 | 0.36 | 19 |
| Boehmite Hi Q ® 180E | Alcoa | 34.5 | 22 | 0.16 | 30 |
| Gamma-alumina Puralox ®/Catalox ® SCCa 5/150 | Sasal | — | 137 | 0.48 | 14 |
| Mixed Boehmites Dispal ® 23N4-80:18N4-80 | Sasol | 10 (50 wt %) 15 (50 wt %) | 172 | 0.32 | 7.4 |

TABLE 2

| Ex # | Support Type | Catalyst BET Surface Area, m²/g | Catalyst Pore Volume, cc/g | Avg. Pore Diameter of Catalyst, nm | XRD (Avg. Crystallite Size of Catalyst and/or Phase) |
|---|---|---|---|---|---|
| 1 | Boehmite Hi Q ® 502-02 | 63 | 0.12 | 7.3 | 16.1, $Co_3O_4$ |
| 2 | Boehmite Dispal ® 23N4-80 | 81 | 0.19 | 9.4 | 11.6, $Co_3O_4$ |
| 3 | Boehmite Dispal ® 18N4-80 | 75 | 0.20 | 10.6 | 12.5, $Co_3O_4$ |
| 4 | Boehmite Dispal ® 14N4-80 | 54 | 0.22 | 15 | 18.0, $Co_3O_4$ |
| 5 | Boehmite Hi Q ® 180E | 42 | 0.23 | 22 | 23.0, $Co_3O_4$ |
| 6 | Gamma-alumina Puralox ®/Catalox ® SCCa 5/150 | 94 | 0.25 | 10.8 | 14.2, $Co_3O_4$ |
| 7 | Mixed Boehmites Dispal ® 23N4-80:Dispal ® 18N4-80 (50:50) | 68 | 0.17 | 10.1 | 16.5, $Co_3O_4$ |
| 8 | Mixed Boehmites Disperal ® P2:Dispal ® 18N4-80 (4:96) | 91 | 0.19 | 7.7 | nd |
| 9 | Mixed Boehmites Disperal ® P2:Dispal ® 23N4-80 (4:96) | 91 | 0.20 | 7.9 | nd | nd: not determined

The FT catalysts prepared in Examples 1–9 were separately placed in a fixed bed reactor to measure their catalytic performance in the conversion of synthesis gas to hydrocarbons during a FT process. The fixed bed reactor was operated at a pressure of 360 psig a temperature of 220° C., and a space velocity of 6 NL/h/g catalyst. The performance (CO conversion, $C_1$ make, and $C_{5+}$ productivity in gram of $C_{5+}$ hydrocarbons per hour per kilogram of catalyst) of these nine catalysts versus the time on stream (TOS) in the fixed bed reactor was then compared, as shown in Table 3 below.

TABLE 3

| Ex No. | Support Type | Catalyst Composition on Support | TOS, h | CO conv., % | $C_1$, wt. % | $C_{5+}$, g/h/kg Cat. |
|---|---|---|---|---|---|---|
| 1 | Boehmite Hi Q ® 502-02 | 30% Co/0.03% Pt/0.5% B | 96 | 50 | 9.4 | 495 |
| 2 | Boehmite Dispal ® 23N4-80 | 30% Co/0.03% Pt/0.5% B | 72 | 61 | 8.4 | 621 |
| 3 | Boehmite Dispal ® 18N4-80 | 30% Co/0.03% Pt/0.5% B | 72 | 76 | 9.0 | 753 |
| 4 | Boehmite Dispal ® 14N4-80 | 30% Co/0.03% Pt/0.5% B | 96 | 69 | 9.3 | 686 |
| 5 | Boehmite Hi Q ® 180E | 30% Co/0.03% Pt/0.5% B | 48 | 47 | 9.4 | 465 |
| 6 | Gamma-alumina Puralox ®/Catalox ® SCCa 5/150 | 25% Co/0.03% Pt/0.5% B | 96 | 62 | 10 | 604 |
| 7 | Mixed Boehmites Dispal ® 23N4-80:Dispal ® 18N4-80 (50:50) | 30% Co/0.03% Pt/0.5% B | 72 | 69 | 8.9 | 686 |
| 8 | Mixed Boehmites Disperal ® P2:Dispal ® 18N4-80 (4:96) | 30% Co/0.03% Pt/0.5% B | 72 | 73 | 8.9 | 706 |
| 9 | Mixed Boehmites Disperal ® P2:Dispal ® 23N4-80 (4:96) | 30% Co/0.03% Pt/0.5% B | 72 | 55 | 9.4 | 550 |

Based on the results in Table 3, the higher amounts of $C_{5+}$ hydrocarbons were the ones formed in Examples 2, 3, and 4, which were derived from a single boehmite having average crystallite sizes of 10 nm, 15 nm, and 25 nm, respectively, and those formed in Examples 7 and 8 from a mixture of 10 and 15 nm boehmites and a mixture of 4 and 15 nm boehmites, respectively. The catalysts derived from a single boehmite material having an average crystallite size of 8.4 nm (Examples 1) or of 34.5 nm (Example 5) or from mixed boehmites having average crystallite sizes of 4 and 10 nm (Example 9) yielded much lower % conversions of CO (below 60%) and lower productivities of $C_{5+}$ hydrocarbons (below 600 g/h/kg Cat), than that obtained with Examples 2–4 and Example 6 (based on gamma-alumina). As such, the catalysts derived from boehmite having 10 nm, 15 nm, 25 nm average crystallite sizes performed better than the cobalt-based catalysts derived from boehmite having smaller (8.4 nm) and larger (34.5 nm) crystallites.

The FT catalysts prepared in Examples 1–3 were also separately placed in a continuously stirred tank reactor (CSTR) to facilitate the conversion of syngas to hydrocarbons during a FT process. The CSTR was operated at a pressure of 350 psig, a temperature of 225° C., and a space velocity of 9 normal liters per hour per gram of catalyst (NL/hr/g catalyst). The performance (CO conversion, $C_1$ make, and $C_{5+}$ productivity in gram of $C_{5+}$ hydrocarbons per hour per kilogram of catalyst) of these three catalysts in the CSTR were then compared, as shown in Table 4 below:

TABLE 4

| Time, h | CO % Conversion | $C_1$, wt. % | $C_5^+$, g/h/kgcat |
|---|---|---|---|
| Example 1: (30% Co/0.03% Pt/0.5% B on Boehmite with 8.4 nm average crystallite size) | | | |
| 27 | 13.3 | 9.2 | 212 |
| 51 | 15.7 | 9.4 | 250 |
| 75 | 17.8 | 9.6 | 280 |
| 148 | 19.4 | 10.1 | 300 |
| Example 2: (30% Co/0.03% Pt/0.5% B on Boehmite with 10 nm average crystallite size) | | | |
| 84 | 35.5 | 10.9 | 534 |
| 105 | 41.6 | 8.1 | 657 |
| 130 | 39.4 | 8.6 | 615 |
| Example 3: (30% Co/0.03% Pt/0.5% B on Boehmite with 15 nm average crystallite size) | | | |
| 52 | 51.0 | 7.3 | 812 |
| 80 | 49.4 | 7.4 | 798 |
| 113 | 49.4 | 6.5 | 801 |
| 147 | 42.0 | 8.1 | 656 |
| 172 | 40.1 | 8.2 | 618 |

Drawing attention to Table 4, the catalysts derived from the single boehmites with a 10 nm average crystallite size (Example 2) and with a 15 nm average crystallite size (Example 3) generally yielded relatively higher % conversions of CO and relatively higher amounts of $C_5^+$ hydrocarbons than the catalyst derived from the single boehmite having a 8.4 nm boehmite average crystallite size (Example 1). This better performance of Examples 2 and 3 compared to Example 1 in a CSTR confirmed the results obtained in the fixed bed reactor as shown in Table 3.

The hydrothermal stability of some of the catalyst examples was determined using a steaming test. The steaming test comprised exposing a 1 g catalyst sample to about 15 g of water in an autoclave at a temperature of 225° C. and a pressure of 375 psig (approximating the Fischer-Tropsch operating conditions) for 2 hours. The catalyst sample was cooled down to room temperature (about 18–20° C.) and then dried at about 80° C. for about 5 hours. Two samples (before and after steam treatment) were then analyzed for changes in surface area and pore size. Both samples were measured by the BJH desorption method as described above. The results for Examples 2, 6, 7, and 8 are shown in Table 5. Both examples 2 and 7, which were derived from, respectively, a single boehmite material and mixed 50:50 boehmite materials of average crystallite sizes of 10 nm and 15 nm, showed better hydrothermal stability than Example 6, which was derived from gamma-alumina. That is, both the surface area and the pore size did not change as much after the steam treatment. However, Example 8, which had mixed 4:96 boehmite materials of average crystallite sizes of 4 nm and 15 nm, was not as hydrothermally resistant as the other 3 samples.

TABLE 5

| | | BET, $m^2$/g catalyst | | | Pore size, nm | | |
|---|---|---|---|---|---|---|---|
| Ex. | Support | Before steam | After steam | % change | Before steam | After steam | % change |
| 6 | Gamma-alumina | 94 | 113 | 20 | 10.8 | 9.1 | 16 |
| 2 | Boehmite, 10 nm | 86 | 96 | 11 | 8.2 | 7.4 | 13 |
| 7 | Boehmite, 50 (10 nm): 50 (15 nm) | 68 | 64 | 6 | 10.1 | 9.1 | 10 |
| 8 | Boehmite, 4 (4 nm): 96 (15 nm) | 91 | 70 | 23 | 7.7 | 11.0 | 43 |

While the preferred embodiments of the invention have been shown and described, modifications thereof can be made by one skilled in the art without departing from the spirit and teachings of the invention. Reactor design criteria, pendant hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for forming a catalyst, comprising:
   (a) contacting a support material with a metal-containing compound to form a catalyst precursor, wherein the support material comprises boehmite having an average crystallite size of from about 4 nm to about 30 nm; and
   (b) treating the catalyst precursor to obtain a catalytic metal oxide from the catalytic metal-containing compound and to obtain a catalyst support from the boehmite.

2. The method of claim 1 wherein the average crystallite size is in a range of from about 6 nm to about 30 nm.

3. The method of claim 1 wherein the average crystallite size is in a range of from about 8 nm to about 25 nm.

4. The method of claim 1 wherein the average crystallite size is in a range of from about 10 nm to about 20 nm.

5. The method of claim 1 wherein the catalyst support comprises a stabilized aluminum oxide structure.

6. The method of claim 5 wherein the stabilized aluminum oxide structure comprises gamma-alumina.

7. The method of claim 1, further comprising pretreating the support material before said contacting the support material with the catalytic metal-containing compound.

8. The method of claim 7 wherein the pretreating comprises spray-drying.

9. The method of claim 7 wherein the pretreating comprises preheating at a temperature of from about 250° C. to about 350° C.

10. The method of claim 7 wherein the pretreating comprises spray-drying and preheating at a temperature of from about 300° C. to about 350° C.

11. The method of claim 1 wherein said treating the catalyst precursor comprises calcining the catalyst precursor to convert at least a portion of the catalytic metal-containing compound to a metal oxide and at least a portion of the boehmite to a stabilized aluminum oxide structure.

12. The method of claim 11 wherein the calcining is performed at a temperature of from about 200° C. to about 800° C.

13. The method of claim 11 wherein the calcining is performed at a temperature of from about 350° C. to about 800° C.

14. The method of claim 11 wherein the calcining is performed at a temperature of from about 450° C. to about 800° C.

15. The method of claim 11 wherein said treating the catalyst precursor further comprises reducing the metal oxide to form the catalytic metal.

16. The method of claim 1 wherein the catalytic metal is selected from a group consisting of cobalt, iron, nickel, ruthenium, and combinations thereof.

17. The method of claim 1, wherein the catalytic metal is cobalt.

18. The method of claim 1 wherein the boehmite is dispersible in acid.

19. The method of claim 1 wherein the boehmite is non-dispersible in aqueous solution.

20. The method of claim 1 wherein the contacting step (a) comprises a multi-step incipient wetness impregnation of the catalytic metal-containing compound; and wherein the treating step (b) includes a first calcination performed at a temperature from about 450° C. to about 800° C., and any calcination after the first calcination proceeds at a temperature of not more than about 450° C.

21. A method for forming a catalyst, comprising:
(a) contacting a support material with a catalytic metal-containing compound to form a catalyst precursor, wherein the support material comprises boehmite, and wherein the boehmite comprises a mixture of a first boehmite material having a first average crystallite size and a second boehmite material having a second average crystallite size, wherein the first and second average crystallite sizes differ by at least 1 nm, and further wherein the first boehmite material, the second boehmite material, or both have an average crystallite size of from about 4 nm to about 30 nm; and
(b) treating the catalyst precursor to obtain a catalytic metal oxide from the catalytic metal-containing compound and to obtain a catalyst support from the boehmite.

22. The method of claim 21 wherein the first average crystallite size is at least about 1 nm smaller than the second average crystallite size.

23. The method of claim 21 wherein the first average crystallite size is at least about 3 nm smaller than the second average crystallite size.

24. The method of claim 21 wherein the first average crystallite size is at least about 5 nm smaller than the second average crystallite size.

25. The method of claim 21 wherein the first average crystallite size is in a range of from about 4 nm to about 15 nm, and wherein the second average crystallite size is in a range of from about 10 nm to about 30 nm.

26. The method of claim 25 wherein a weight ratio of the first boehmite material to the second boehmite material is in a range of from about 1:99 to about 99:1.

27. The method of claim 26 wherein the weight ratio the first boehmite material to the second boehmite material is in a range of from about 1:3 to about 3:1.

28. The method of claim 26 wherein the weight ratio of the first boehmite material to the second boehmite material is about 1:1.

29. The method of claim 21 wherein the first boehmite has an average crystallite size between about 4 and about 10 nm; and the second boehmite has an average crystallite size between 8 nm and 30 mm.

30. The method of claim 29 wherein a weight ratio of the first boehmite material to the second boehmite material is in a range of from about 1:99 to about 1:4.

31. The method of claim 29 wherein a weight ratio of the first boehmite material to the second boehmite material is in a range of from about 1:99 to about 5:95.

32. The method of claim 21 wherein the first boehmite has an average crystallite size between about S and about 20 nm; and the second boehmite has an average crystallite size between 20 nm and 30 nm.

33. The method of claim 32 wherein a weight ratio of the first boehmite material to the second boehmite material is in a range of from about 4:1 to about 99:1.

34. The method of claim 32 wherein a weight ratio of the first boehmite material to the second boehmite material is in a range of from about 99:1 to about 95:5.

35. A method for forming a catalyst, comprising:
(a) contacting a support material with a catalytic metal-containing compound to form a catalyst precursor, wherein the support material comprises a mixture of at least two boehmites with various average crystallite sizes, wherein the average crystallite sizes differ by at least I rub-n; and
(b) treating the catalyst precursor to decompose the catalytic metal-containing compound to a catalytic metal oxide and to transform either partially or totally the boehmite of the support material to a stabilized aluminum oxide structure.

36. The method of claim 35 wherein the boehmite comprises a mixture of a first boehmite material having a first average crystallite size and a second boehmite material having a second average crystallite size, wherein the first average crystallite size is at least 1 nm smaller than the second average crystallite size.

37. The method of claim 36 wherein the first average crystallite size is at least 3 nm smaller than the second average crystallite size.

38. The method of claim 36 wherein the first average crystallite size is at least 5 nm smaller than the second average crystallite size.

39. The method of claim 36 wherein the first average crystallite size is in a range of from about 4 nm to about 15 nm.

40. The method of claim 36 wherein the first average crystallite size is in a range of from about 8 nm to about 20 nm.

41. The method of claim 36 wherein the second average crystallite size is in a range of from about 8 nm to about 30 nm.

42. The method of claim 36 wherein the second average crystallite size is in a range of from about 20 nm to about 30 nm.

43. The method of claim 35 wherein one of the at least two boehmites has an average crystallite size from about 10 nm to about 20 nm.

44. The method of claim 35 wherein the catalytic metal is selected from a group consisting of cobalt, iron, nickel, ruthenium, and combinations thereof.

45. The method of claim 35, wherein the catalytic metal is cobalt.

46. The method of claim 35, further comprising pretreating the support material before said contacting the support material with the catalytic metal-containing compound, wherein the pretreating comprises spray-drying; preheating at a temperature of from about 250° C. to about 350° C.; or spray-drying and then preheating at a temperature of horn about 300° C. to about 350° C.

47. The method of claim 35 wherein the at least two boehmites are spray-dried boehmites.

48. The method of claim 35 wherein the contacting step (a) comprises a multi-step incipient wetness impregnation of the catalytic metal-containing compound; and wherein the treating step (b) includes a first calcination performed at a temperature from about 450° C. to about 800° C., and any calcination after the first calcination proceeds at a temperature of not more than about 450° C.

* * * * *

UNITED STATES PATENT AND TRADEMARK OFFICE
CERTIFICATE OF CORRECTION

PATENT NO. : 7,176,160 B2  Page 1 of 1
APPLICATION NO. : 10/688412
DATED : February 13, 2007
INVENTOR(S) : Rafael L. Espinoza et al.

It is certified that error appears in the above-identified patent and that said Letters Patent is hereby corrected as shown below:

Column 24,
Line 51, the word "catalytic" was omitted before the words --metal-containing--.

Column 26,
Line 31, "about S" should read --about 8--.

Column 26,
Line 46, "1 rub-n" should read --1 nm--.

Column 28,
Line 6, "horn" should read --from--.

Signed and Sealed this

Fourth Day of March, 2008

JON W. DUDAS
*Director of the United States Patent and Trademark Office*